(12) United States Patent
Driscoll (10) Patent No.: US 12,092,500 B2
(45) Date of Patent: Sep. 17, 2024

(54) FLUID FLOW DETECTION DEVICE

(71) Applicant: Thomas P Driscoll, Crozet, VA (US)

(72) Inventor: Thomas P Driscoll, Crozet, VA (US)

(*) Notice: Subject to any disclaimer, the term of this patent is extended or adjusted under 35 U.S.C. 154(b) by 0 days.

(21) Appl. No.: 17/717,100

(22) Filed: Apr. 10, 2022

(65) Prior Publication Data

US 2023/0324206 A1 Oct. 12, 2023

(51) Int. Cl.
*G01F 1/075* (2006.01)

(52) U.S. Cl.
CPC ..................... *G01F 1/075* (2013.01)

(58) Field of Classification Search
CPC ............. G01F 1/075; G01F 1/56; G01F 23/38
See application file for complete search history.

(56) References Cited

U.S. PATENT DOCUMENTS

| | | | | |
|---|---|---|---|---|
| 5,945,608 A | * | 8/1999 | Hutchinson | G01P 5/04 73/861.71 |
| 6,114,823 A | * | 9/2000 | Doner | F16K 37/0033 318/647 |
| 6,129,103 A | * | 10/2000 | Fields | F16K 31/48 239/70 |
| 7,105,756 B1 | * | 9/2006 | Plaschkes | H01H 35/405 200/81.9 M |
| 2020/0240820 A1 | * | 7/2020 | Boerhout | G01N 21/3504 |
| 2021/0130169 A1 | * | 5/2021 | Lynn | C11D 11/0023 |

* cited by examiner

*Primary Examiner* — Peter J Macchiarolo
*Assistant Examiner* — John M Royston
(74) *Attorney, Agent, or Firm* — Robert H. Frantz (57) ABSTRACT

A fluid flow sensing device having at least a stem and a paddle portion which is pivotally disposed with the stem, and a magnetic opener which biases the paddle away from the stem to into an "off" position. Upon sufficient pressure impending on the paddle by flowing fluid to overcome the force of the magnetic opener, the paddle pivots towards the stem to an "on" position, which is sensed by a device such as a Hall effect sensor, reed switch, or optical sensor.

18 Claims, 7 Drawing Sheets

FLUID FLOW DETECTION DEVICE

FIELD OF THE INVENTION

The invention generally relates to technologies to detect the flow of fluid in a pipe, duct, conduit or other fluid conveying vessel.

BACKGROUND OF THE INVENTION

Flow detection devices for pipes, ducts, and conduits known in the art typically utilize springs or elasticity of a material to resist the drag force of fluid flowing in the pipe, duct or conduit. Flow detection devices are used in and are needed in a wide range of applications, including but not limited to industrial processes, engines, medical devices, heating and air conditioning, and swimming pools just to name a few examples.

SUMMARY OF THE DISCLOSED EMBODIMENTS

A device that detects the flow of a fluid in a pipe, duct, conduit or other fluid conveying vessel, having at least a stem and a paddle portion which is pivotally disposed with the stem, and a magnetic opener which biases the paddle away from the stem to into an "off" position. Upon sufficient pressure impending on the paddle by flowing fluid to overcome the force of the magnetic opener, the paddle pivots towards the stem to an "on" position, which is sensed by a device such as a Hall effect sensor, reed switch, or optical sensor.

BRIEF DESCRIPTION OF THE DRAWINGS

The following drawings, which considered in conjunction with the present disclosure, form a complete description of one or more example embodiments in which like reference numbers represent the same or similar components of the embodiment(s).

DETAILED DESCRIPTION OF ONE OR MORE EXEMPLARY

Embodiment(s) of the Invention

The inventor of the present invention has recognized a problem in the art not previously recognized or addressed regarding devices for the detection of fluid flow in a pipe, duct, conduit or other fluid conveying vessel. Available fluid flow detection devices utilize springs or elasticity of a material to resist a drag force of fluid flowing in the pipe, duct or conduit. These components, however, can prematurely wear out from stress, corrosion and fatigue failure. The present inventor has recognized that there exists a need in the art for a fluid flow detection device that eliminates these issues and which can be readily produced and installed.

While some currently-available fluid flow devices utilize magnets to resist the fluid flow drag force, the fluid displacement required to insert the sensing portion of the device into the flowing fluid can cause an undesirable variance in the activation and deactivation points of the switch. The present inventor has recognized this problem, as well, and discloses the present example embodiment(s) accordingly.

The present disclosure describes an example flow detection device utilizing magnets for resistance to fluid flow drag force and actuation of the fluid flow detection device. At least one example fluid flow detection device is configured to activate a magnetically responsive device, such as but not limited to a reed switch or Hall effect device, once the velocity of fluid around the flow detection device reaches a certain level (i.e., flow rate).

Figure 1:
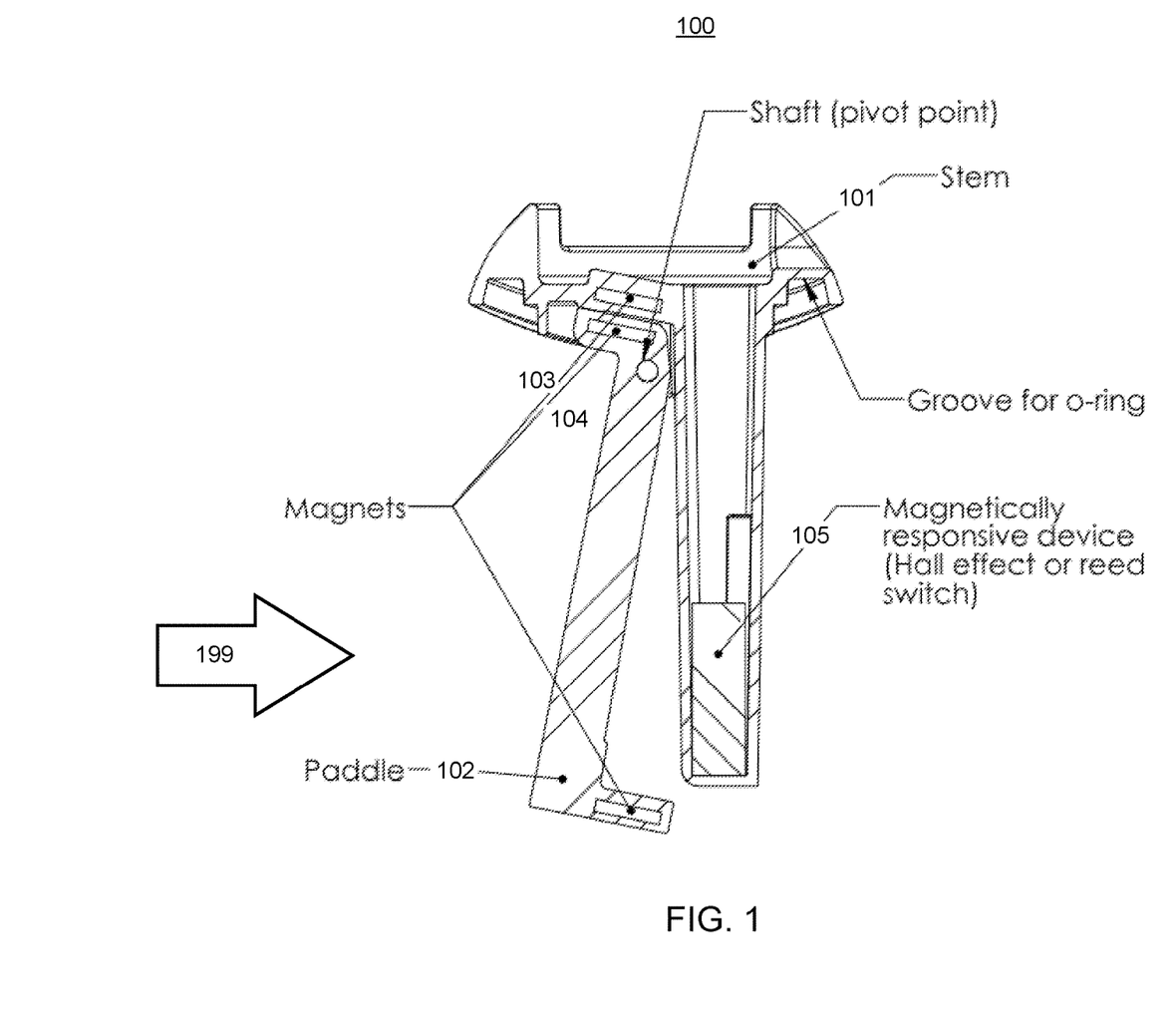
FIG. 1 depicts an arrangement of components according to at least one exemplary embodiment of the invention in the "off" position.

Referring now to FIG. 1, stem portion 101 of the example fluid flow detection device 100 is inserted into or received into the path 199 of the flowing fluid in the pipe, duct, conduit, etc. In an "off" position, as shown in FIG. 1, a first magnet 103 positioned in or on the stem and a second magnet 104 in the paddle body 102 are physically pulled towards one another. These two magnets 103, 104 have opposite magnetic polarity facing each other to produce the magnetic attraction force between them. In this configuration, the second magnet 104 in the paddle body 102 is positioned mechanically outside the magnetic sensing range of the magnetically responsive device 105. As the flow rate of fluid 199 increases and impends against the paddle 102, the drag force experienced by the paddle 102 increases with it. At a specific fluid velocity, the drag force produced by the paddle overcomes the pull attraction force between the embedded magnets 103, 104 and the paddle 102 moves towards the stem 101 until it is in contact with the stem 101, putting the device 100 into an "on" position. In another embodiment, one of first and second magnets 103, 104, may be replaced with a component which is attracted by magnetism, such as an iron alloy slug or plate, or a plastic or ceramic slug or plate which has iron particles embedded into it.

Figure 2:
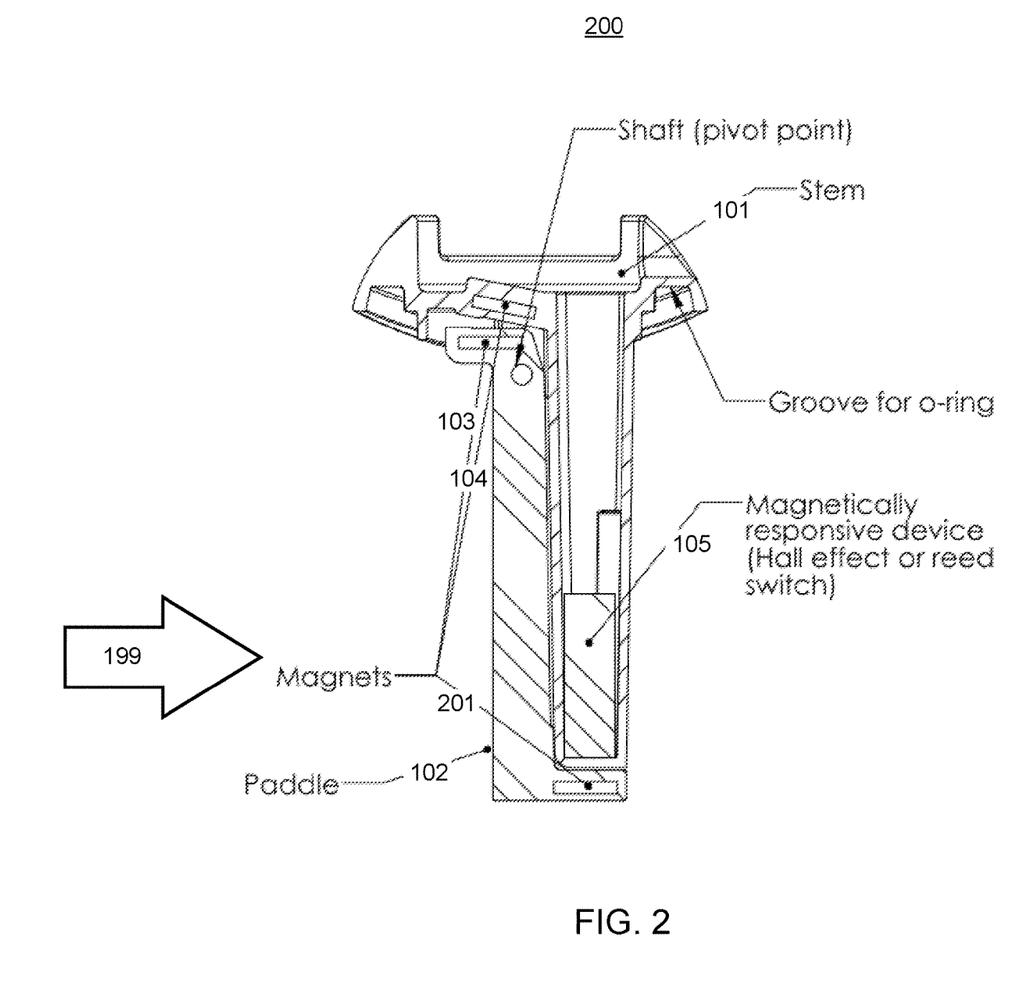
FIG. 2 depicts an arrangement of components according to at least one exemplary embodiment of the invention in the "on" position.

Referring now to FIG. 2, the example embodiment is shown 200 in the "on" position, which causes a third magnet 201 affixed to or embedded in the paddle 102 to be within sensing range of the magnetically responsive device 105. The magnetically responsive device 105 then sends an electronic signal to a controller or similar device indicating fluid is flowing at or above a predetermined velocity corresponding to the pressure required to break the attraction force of the first and second magnets 103, 104. In another embodiment, the magnetically responsive device 105 may be substituted with or augmented to include an optically sensitive device, and the third magnet 201 may be substituted with or augmented to include a optical path modulator, such as a reflective surface or an optical path interrupter portion.

Figure 3:
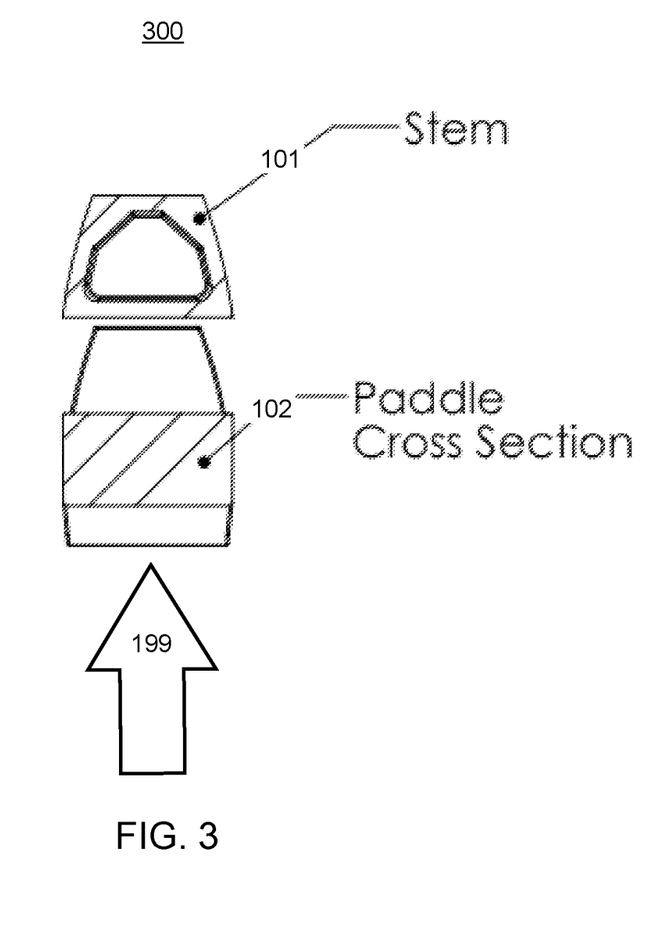
FIG. 3 depicts the cross section of the paddle in the "off" position.
Figure 4:
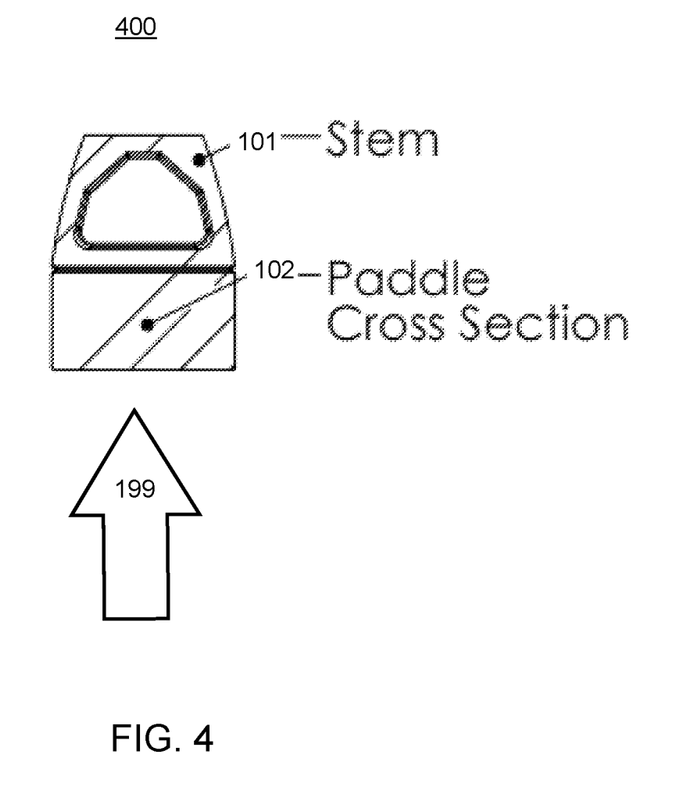
FIG. 4 depicts the cross section of the paddle in the "on" position.

Referring to FIG. 3, a example cross section 300 of the paddle 102 in the "off" position is shown. In the "off" position, the cross section taken in the direction of the flow of fluid 199 of the paddle 102 generally resembles a rectangle, giving it a specific drag coefficient. When the paddle 102 moves into the "on" position, as shown 400 in FIG. 4, the turbulent zone behind the paddle is eliminated because the cross section now resembles a truncated streamlined body causing the drag coefficient to be lower than it is in the "off" position. This off-position reduced drag coefficient allows the paddle to move back (return) to the "off" position at a flow rate closer to that which caused it to move from the "on" to "off" position than would otherwise be possible using magnet pull force due to the exponential drop off in pull force as the distance between magnets increases.

Figure 6:
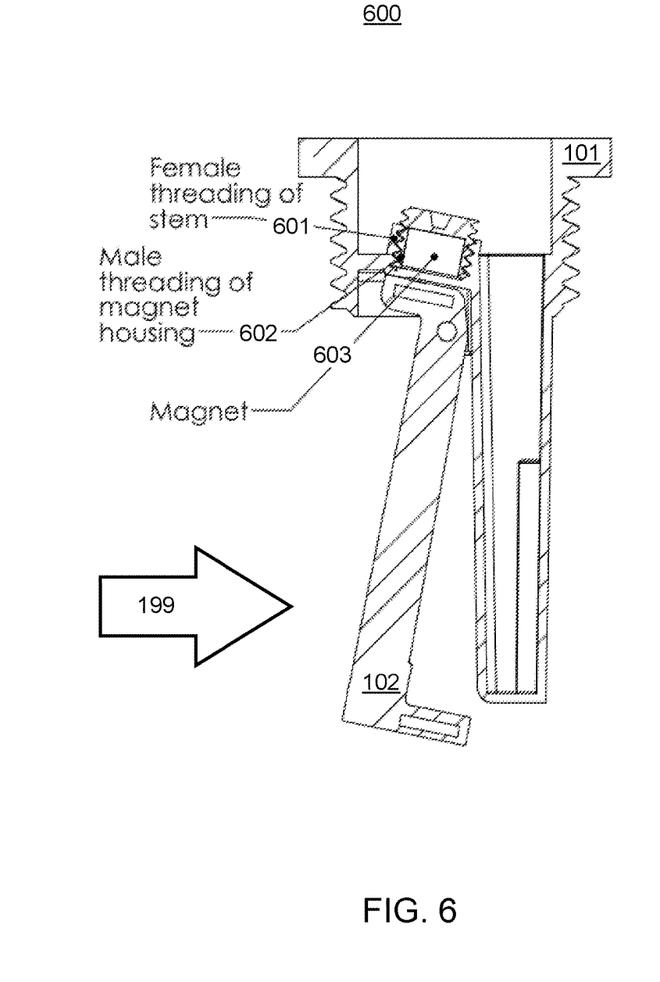
FIG. 6 depicts the cross section of an adjustable embodiment of the fluid flow detector utilizing a threaded magnet housing.

Referring to FIG. 6, at least one additional embodiment 600 is shown which utilizes a magnet 603 embedded in a male threaded 602 housing that mates with a female threaded 601 section of the stem. This threaded assembly allows the magnet 603 to be moved closer or further from the magnet embedded in or affixed to the paddle, thereby increasing or decreasing, respectively, the pull force between the magnets, and thus allowing for an adjustment in the minimum fluid velocity or flow rate required to activate the fluid flow detection device.

Figure 5:
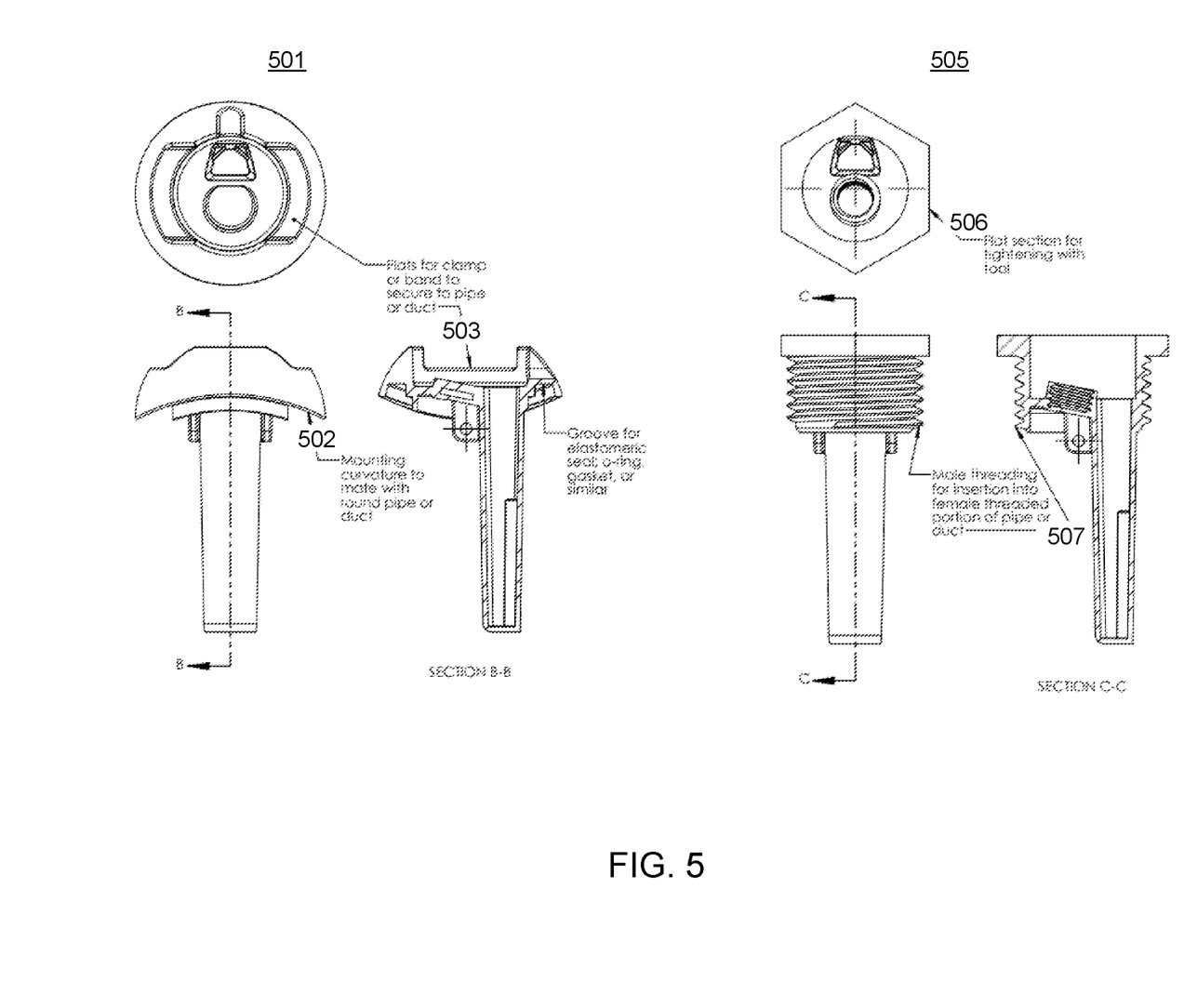
FIG. 5 depicts alternate methods, structures and components for attaching a stem body to pipe or duct.

FIG. 5 depicts alternate methods, structures and components for attaching a stem body to pipe or duct, including an embodiment 501 with a curvature 502 formed in a head portion of the stem body to mate against and seal to the outside of a round pipe, duct or conduit, and a flat area 503 on the head portion for receiving a clamp or a band to secure the device to the pipe, duct or conduit. Either feature can be used individually, or in conjunction with each other or with other features described herein. FIG. 5 also shows an embodiment 505 with opposing flat edges 506 for receiving a tool such as a wrench and a threading 507 for engaging into a threaded opening in the pipe, duct or conduit. Again, either feature can be used individually, or in conjunction with each other or with other features described herein.

Figure 7:
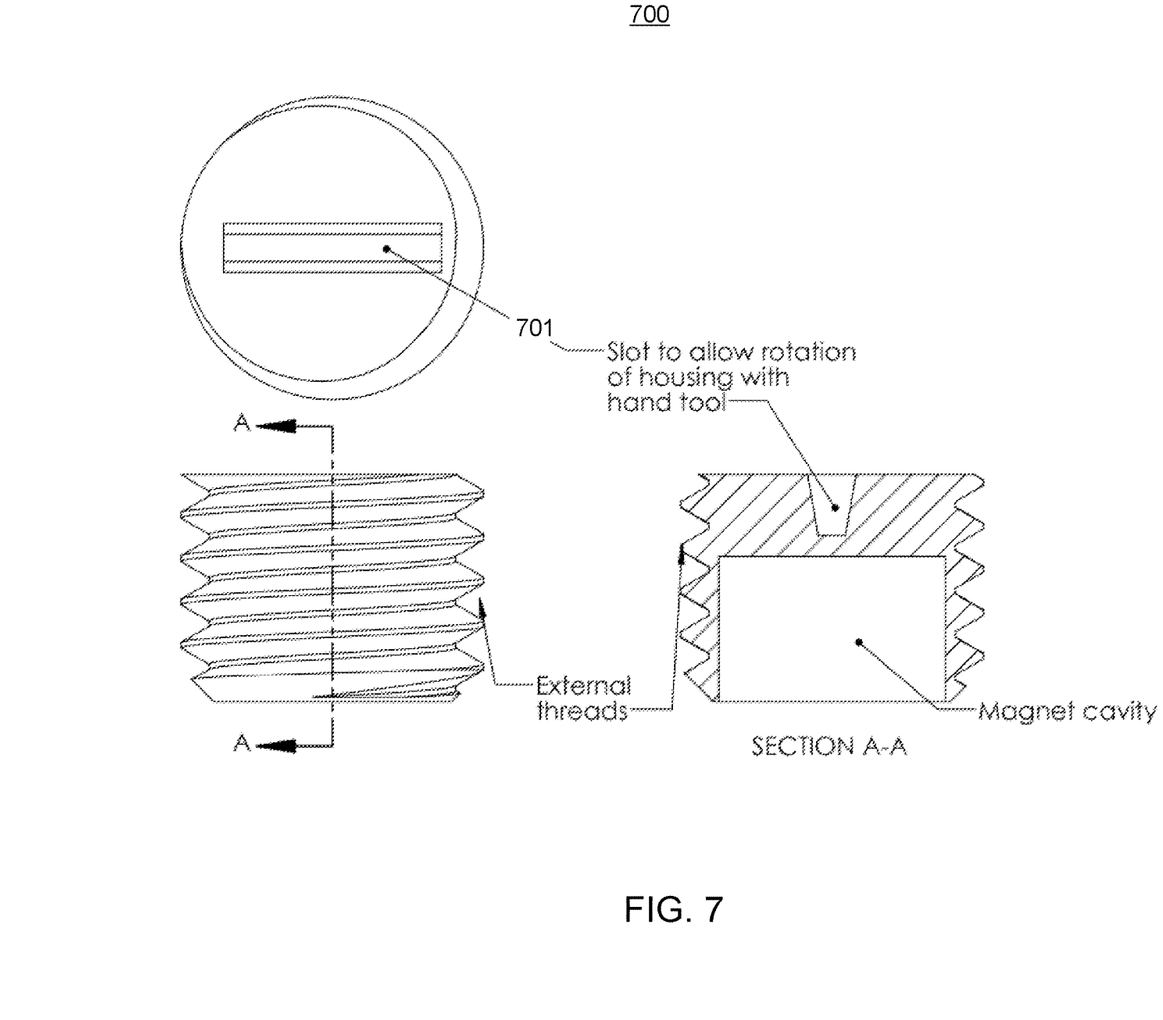
FIG. 7 depicts the threaded housing for the magnet to enable adjustment of the pull force.

FIG. 7 provides details of at least one embodiment of a threaded housing 700 for the magnet to enable adjustment of the pull force, such as the embodiment disclosed in FIG. 6, including a slot 701 or other tool-receiving indentation or protrusion to allow an installer to rotate the housing 700 to move the position of the magnet and increase or decrease the flow rate sensing threshold, as previously discussed.

CONCLUSION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless specifically stated otherwise.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated. It will be readily recognized by those skilled in the art that the foregoing example embodiments do not define the extent or scope of the present invention, but instead are provided as illustrations of how to make and use at least one embodiment of the invention. The following claims define the extent and scope of at least one invention disclosed herein

What is claimed is:

1. A fluid flow sensing device comprising:
a stem portion;
a paddle portion;
a pivot disposed between the stem portion and the paddle portion;
a magnetic opener configured to bias the paddle portion away from the stem portion into an "off" position thereby creating a cavitation space between the paddle portion and the stem portion; and
a sensing device associated with the stem portion and the paddle portion which, upon a sufficient pressure impending on the paddle portion by a flowing fluid to overcome the magnetic opener causing the paddle portion to pivot to an "on" position towards the stem portion thereby reducing the cavitation space and forming a truncated streamlined body combining the paddle portion and the stem portion, creates an electronic signal indicating detection of fluid flow above a predetermined flow rate threshold of the flowing fluid;
wherein a first fluid drag coefficient of the paddle portion and stem portion in the "off" position measured in a direction of fluid flow from the paddle portion moving towards the stem portion has a first value, and wherein a second fluid drag coefficient of the paddle portion and stem portion in the "on" position measured in the direction of fluid flow from the paddle portion moving towards the stem portion has a second value, wherein the second value is less than the first value, thereby offsetting a loss in force of the magnetic opener to return the paddle portion to the "off" from the "on" position when fluid flow rate transitions from above the predetermined flow rate threshold to below the predetermined threshold.

2. The fluid flow sensing device of claim 1 in which the magnetic opener comprises at least a first magnet and at least one opposing component which is magnetically attracted to the first magnet.

3. The fluid flow sensing device of claim 2 wherein the at least one opposing component comprises a second magnet, wherein the first and second magnets are configured with opposite poles facing each other.

4. The fluid flow sensing device of claim 1 wherein the sensing device comprises a Hall effect sensor.

5. The fluid flow sensing device of claim 1 wherein the sensing device comprises a reed switch.

6. The fluid flow sensing device of claim 1 wherein the sensing device comprises an optical sensor.

7. The fluid flow sensing device of claim 1 wherein the paddle portion comprises a magnet disposed away from the pivot and towards the sensing device.

8. The fluid flow sensing device of claim 1 further comprising an adjustable portion to increase or decrease a biasing force of the magnetic opener, thereby allowing adjustment of the predetermined flow rate threshold.

9. The fluid flow sensing device of claim 8 wherein the adjustable portion comprises a threaded rotatable portion which, upon rotation, increases or decreases a distance between at least one magnet and at least one magnetically-attracted component.

10. The fluid flow sensing device of claim 8 wherein the adjustable portion further comprises a tool receiving feature.

11. The fluid flow sensing device of claim 1 further comprising a head portion mechanically associated with the stem portion and the paddle portion, wherein the head portion engages a fluid conveying vessel to position the stem portion and the head portion into the vessel to sense fluid flow within the vessel.

12. The fluid flow sensing device of claim 11 wherein the head portion is provided with a curved surface configured to engage an outer surface of a round vessel.

13. The fluid flow sensing device of claim 11 wherein the head portion is provided with a tool receiving portion.

14. The fluid flow sensing device of claim 11 wherein the head portion is provided with a threaded portion configured to engage the vessel.

15. The fluid flow sensing device of claim 11 wherein the head portion is provided with a flat portion configured to receive a retention band or clamp.

16. The fluid flow sensing device of claim 1 wherein a cross section of the paddle portion and stem portion in the "off" position resembles a rectangle, thereby producing a turbulent zone behind the paddle portion, and wherein a cross section of the paddle portion and the stem portion in the "on" position resembles a truncated streamlined body, thereby eliminating the turbulent zone.

17. A fluid flow sensing device comprising:
a stem portion;
a paddle portion;
a pivot disposed between the stem portion and the paddle portion;
a magnetic opener configured to bias the paddle portion away from the stem portion into an "off" position;
a sensing device associated with the stem portion and the paddle portion which, upon a sufficient pressure impending on the paddle portion by a flowing fluid to overcome the magnetic opener causing the paddle portion to pivot to an "on" position towards the stem portion, creates an electronic signal indicating detection of fluid flow above a predetermined flow rate threshold, and
an adjustable portion to increase or decrease a biasing force of the magnetic opener, thereby allowing adjustment of the predetermined flow rate threshold.

18. The fluid flow sensing device of claim 17 wherein a first fluid drag coefficient of the paddle portion and stem portion in the "off" position measured in a direction of fluid flow from the paddle portion moving towards the stem portion has a first value, and wherein a second fluid drag coefficient of the paddle portion and stem portion in the "on" position measured in the direction of fluid flow from the paddle portion moving towards the stem portion has a second value, wherein the second value is less than the first value, thereby offsetting a loss in force of the magnetic opener to return the paddle portion to the "off" from the "on" position when fluid flow rate transitions from above the predetermined flow rate threshold to below the predetermined threshold.

* * * * *